United States Patent [19]

Liman et al.

[11] Patent Number: 5,716,564
[45] Date of Patent: Feb. 10, 1998

[54] PROCESS FOR THE PRODUCTION OF COMPOSITE SHEET BODIES WHICH ARE SUITABLE AS SELF-SUPPORTING COMPONENTS IN AUTOMOBILES

[75] Inventors: Ulrich Liman, Langenfeld; Hans Kath, Köln; Klaus-Werner Huland, Wermelskirchen, all of Germany

[73] Assignee: Bayer Aktiengesellschaft, Leverkusen, Germany

[21] Appl. No.: 584,873

[22] Filed: Jan. 11, 1996

[30] Foreign Application Priority Data

Jan. 17, 1995 [DE] Germany .................. 195 01 198.8

[51] Int. Cl.⁶ .................. B32B 5/18; B32B 5/20
[52] U.S. Cl. .................. 264/46.4; 264/46.6
[58] Field of Search .................. 264/46.4, 46.5, 264/46.6, 53, 54; 156/77, 78, 79; 521/99

[56] References Cited

U.S. PATENT DOCUMENTS

| | | | |
|---|---|---|---|
| 3,929,247 | 12/1975 | Borup | 220/444 |
| 4,916,173 | 4/1990 | Otloski | 521/54 |
| 5,210,127 | 5/1993 | Werner | 521/131 |
| 5,350,781 | 9/1994 | Liman | 521/125 |
| 5,416,125 | 5/1995 | Liman | 521/114 |
| 5,445,879 | 8/1995 | Liman | 521/125 |

Primary Examiner—Daniel Stemmer
Attorney, Agent, or Firm—Joseph C. Gil; N. Denise Brown

[57] ABSTRACT

The present invention relates to a process for the production of composite sheet bodies by back-foaming a flexible facing with a polyurethane foam forming reaction mixture. This polyurethane foam is characterized by a density of less than 300 g/l, preferably from 20 to 150 g/l, and optionally contains isocyanurate groups. Suitable flexible facings include those having a thickness of less than 10 mm, preferably less than 2 mm. This composite bodies produced by this process are suitable for use in the automobile sector as self-supporting components. Conventional stiffening elements are not necessary to produce these self-supporting composite bodies.

6 Claims, No Drawings

_5,716,564_

PROCESS FOR THE PRODUCTION OF COMPOSITE SHEET BODIES WHICH ARE SUITABLE AS SELF-SUPPORTING COMPONENTS IN AUTOMOBILES

BACKGROUND OF THE INVENTION

The present invention relates to the production of composite sheet bodies by backfoaming a flexible, thin facing with a reaction mixture which forms a polyurethane (PUR) foams. These composite bodies are suitable for use as motor vehicle trim in automobiles. The PUR foam used is characterized by an extremely low thermal expansion coupled with the rigidity necessary for the component.

Composite bodies based on PUR, foams and facings are widely used in motor vehicles such as, for example, in instrument panels, arm rests, central consoles or bumpers. In order to ensure adequate dimensional stability, it is necessary to use additional auxiliary agents (reinforcing agents) such as either metal and/or plastics stiffening elements as in, for example, an instrument panel, or a sufficiently thick, stiff facing as in, for example, the exterior shell of a bumper. These additional auxiliary agents has previously been considered essential in order to ensure the dimensional stability of the component over the temperature range −30° C. to 120° C. The coefficient of linear expansion, also referred to hereinbelow as the coefficient of thermal expansion, of the conventional raw materials in current use, such as polypropylene, acrylonitrile-butadiene-styrene (ABS), PUR filling foams, etc., is upwards of $100 \times 10^{-6}$/K, unless auxiliary substances such as fillers or glass mats are used. The addition of conventional reinforcing agents such as fillers, glass mats, stiffening elements, etc. to the process for producing composite bodies not only adds dimensional stability to the composite bodies, but also contributes additional weight to the composite bodies.

SUMMARY OF THE INVENTION

According to the present invention, it has surprisingly been found that a composite body produced by backfoaming a flexible, thin facing with a reaction mixture which forms a polyurethane foam and preferably has a coefficient of thermal expansion of less than $100 \times 10^{-6}$/K and a crush hardness of over 100 kPa at 40% compression are suitable as self-supporting components in automobiles. These composite bodies are produced without the co-use of conventional reinforcing agents such as additional auxiliary agents including, for example fillers, glass mats, etc. Dispensing with such auxiliary agents does not preclude the incorporation, during manufacture of the composite, of assembly elements which serve to attach the desired component in/on the motor vehicle. These assembly elements have no significant effect on the dimensional stability of the component. The composite bodies produced according to the process of the present invention are substantially lighter in weight than similar composite bodies constructed in accordance with the present state of the art.

DETAILED DESCRIPTION OF THE INVENTION

The object of the present invention is a process for the production of composite bodies by back-foaming, in a mold, a flexible facing constituting the top layer with a reaction mixture which reacts fully to form a polyurethane foam. The reaction mixture comprises a polyisocyanate and an isocyanate-reactive component which are selected such that the fully formed polyurethane foam has a density of less than 300 g/l, preferably from 20 to 150 g/l, and optionally contains isocyanurate groups. Flexible facing for the present process are those having a thickness of less than 10 mm, preferably less than 2 mm. Conventional reinforcing agents (stiffening elements) such as those used in RRIM and/or SRIM processes are not necessary in the process of the present invention, and preferably are absent.

In accordance with the present process, it is preferred that:
1) the foam optionally contains isocyanurate groups and has a density of from 20 to 90 g/l.
2) the foam optionally contains isocyanurate groups and exhibits a coefficient of thermal expansion of less than $100 \times 10^{-6}$/K.
3) the foam optionally contains isocyanurate groups and exhibits a crush hardness of more than 100 kPa at 40% compression.
4) the foam optionally contains isocyanurate groups and is prepared from polyisocyanates of the diphenylmethane diisocyanate type.
5) flexible facings are selected from the group consisting of plastics sheets, plastics shells, textile sheets, leather skins and thin metals.
6) composite sheet bodies produced according to this process are suitable for use as bumpers for automobiles, for instrument panels and for energy-absorbing protective elements in the door area.

A further object of the present invention is the composite bodies obtained in accordance with the process described hereinabove.

The manufacture of foams which optionally contain isocyanurate groups is known per se and is described in, for example, in DE-PS 1,112,285, GB-PS 1,104,394, DE-OS 1,59.5,844 and 1,769,023, and in Kunststoff-Handbuch [Plastics Handbook], Vol VII, Polyurethanes, published by Vieweg und Höchtlen, Carl-Hanser-Verlag Munich 1966 and in the new edition of the latter book, published by G. Oertel, Carl-Hanser-Verlag Munich, Vienna 1983.

The following materials are suitable for the reaction mixture for forming the polyurethane foams required by the process of the invention.

Suitable polyisocyanates include, for example, mixtures of diphenylmethane diisocyanates and polyphenyl polymethylene polyisocyanates (crude MDI), and preferably mixtures such as those containing more than 10% by weight, most preferably from 25 to 65% by weight polyphenyl polymethylene polyisocyanates. Other polyisocyanates may additionally be present in the mixture in quantities of up to 50% by weight, based on the total weight of the polyisocyanate mixture. Other polyisocyanates which are also suitable include, for example, those aliphatic, cycloaliphatic, araliphatic, aromatic and heterocyclic polyisocyanates, such as are described, for example, by W. Siefken in Justus Liebigs Annalen der Chemie, 562, pages 75 to 136, and those corresponding to, for example, a formula such as $Q(NCO)_n$ wherein:

n represents: 2 to 4, preferably 2 and 3, and

Q represents: an aliphatic hydrocarbon radical having 2 to 18 carbon atoms, and preferably 6 carbon atoms; a cycloaliphatic hydrocarbon radical having 4 to 15 carbon atoms, and preferably 5 to 10 carbon atoms; an aromatic hydrocarbon radical having 6 to 15 carbon atoms, and preferably 6 to 13 carbon atoms; or an araliphatic hydrocarbon radical having 8 to 15 carbon atoms, and preferably 8 to 13 carbon atoms.

In the above formula, it is most preferred that Q represent an aromatic hydrocarbon radical. Compounds corresponding to the above formula include, for example, polyisocyanates such as are described in DE-OS 2,832,253, pages 10–11. The polyisocyanates which are industrially readily accessible such as, for example, 2,4- and 2,6-tolylene diisocyanate, and any mixtures of the latter isomers ("TDI") are generally particularly preferred.

Suitable isocyanate-reactive components to be used in the foam-forming reaction mixture of the process include compounds containing at least two hydrogen atoms which are reactive with isocyanate groups and in general, having molecular weights of 400 to 10,000. These are commonly referred to as polyol components. As used herein, this is meant to include, for example, compounds containing amino groups, thio groups, and/or carboxyl groups. Preferably, it refers to compounds containing hydroxyl groups, and particularly compounds containing from 2 to 8 hydroxyl groups, preferably those having molecular weights of 1,000 to 6,000, and more preferably 2,000 to 6,000. This includes, for example, polyethers and polyesters containing at least 2, generally from 2 to 8, and preferably from 2 to 6 hydroxyl groups, as well as polycarbonates and polyester amides, such as are known per se for the manufacture of homogeneous and cellular polyurethanes and as are described in, for example, DE-OS 2,832,253, pages 11–18.

The preferred polyols used in the reaction mixture to form the polyurethane foam are polyoxyalkylene polyethers having a hydroxy group in the end position. They are prepared by conventional methods, such as base-catalyzed addition of alkylene oxides such as, for example, ethylene oxide, propylene oxide or butylene oxide to a starter molecule (initiator). Examples of suitable initiators include ethylene glycol, propylene glycol, neopentyl glycol, butylene glycol, hydroquinone, the bisphenols, anilines and other aromatic monoamines, aliphatic mono-amines and monoesters of glycerol; trifunctional initiators such as glycerol, trimethylol-propane, trimethylolethane, N-alkylphenylene diamines, mono-, di- and trialkanolamines; tetrafunctional initiators such as ethylenediamine, propylene-diamine, 2,4'-, 2,2'- and 4,4'-methylene-dianilines, tolylene diamines and penta-erythritol; and hexa- and octa-functional initiators such as sorbitol and sucrose. The addition of the alkylene oxide to the starter molecule may be carried out simultaneously or, when different alkylene oxides are used, sequentially, to prepare block, heteric or block-heteric polyethers. The "Polyurethane Handbook" and "Polyurethanes: Chemistry and Technology" contain references to the above.

Preferred polyethers in the present invention are polyethers initiated with propylene glycol, glycerol and trimethylolpropane prepared by propoxylation with propylene oxide and having a 0 to 50% ethylene oxide block in the end position. Mixtures of these polyethers with other isocyanate-reactive components may also be used. Equally, the polyester polyols or polycarbonate polyols which are known from polyurethane chemistry may be used in the polyol component.

Suitable starting components which are isocyanate-reactive optionally include compounds containing at least two active hydrogen atoms capable of reacting with the isocyanate groups and having molecular weights of 32 to 399. This is also meant to refer to compounds containing hydroxyl groups and/or amino groups and/or thio groups and/or carboxyl groups. Compounds containing hydroxyl groups and/or amino groups are preferred. These low molecular weight compounds serve as chain extenders or as cross-linking agents in the reaction.

These compounds generally contain from 2 to 8, preferably 2 to 4, hydrogen atoms which are reactive with isocyanate groups. Some examples of these are described in DE-OS 2,832,253, pages 19–20.

Suitable blowing agents to used in the reaction mixture according to the invention include, for example, water which may be used alone, or in conjunction with highly volatile organic compounds such as, for example, n-pentane or i-pentane, cyclopentane, 1,1,1,2-tetrafluoroethane or hexafluorobutane. Water is the preferred blowing agent.

In accordance with the present invention, auxiliary agents and additives may optionally be used. These include, for example, other highly volatile organic substances and/or water as additional blowing agents. Water is generally employed in a quantity of from 0.1 to 10% by weight, based on the total weight of high molecular weight isocyanate-reactive components (polyols).

It is also possible that the reaction mixture used to form the polyurethane foam may additionally contain additives such as, for example, catalysts of the type known per se from polyurethane chemistry, surface-active additives, such as emulsifiers and foam stabilizers; flame retardants including, for example, phosphorus-containing, halogen-free flame retardants such as triethyl phosphate, diphenyl cresyl phosphate, red phosphorus; and retarders including, for example, substances which are acid in reaction, such as hydrochloric acid or organic acid halides.

Other optional additives include, for example, cell regulators of the type which are known per se, such as paraffins or fatty alcohols or dimethyl polysiloxanes; pigments and/or dyes. It is also possible to include anti-ageing and anti-weathering stabilizers, plasticizers and fungistats and bacteristats, and fillers such as, for example, barium sulfate, diatomaceous earth, soot or prepared chalk, as auxiliary substances and additives.

The latter optionally added auxiliary substances and additives are described in, for example, DE-OS 2,732,292, pages 21–24.

Further examples of surface-active additives and foam stabilizers, as well as cell regulators, retarders, stabilizers, flame retardants, plasticizers, dyes, and fungistats and bacteristats, which are optionally used in accordance with the present invention, plus details regarding methods of use and their effects are described in, for example, the Kunststoff-Handbuch [Plastics Handbook], Vol. VII, published by Vieweg und Höchtlen, Carl-Hanser-Verlag, Munich 1966, on pages 103–113.

In accordance with the present invention, rigid foams are manufactured.

The components of the reaction mixture which react to form the polyurethane foam may be reacted in, for example, the single-step process, the prepolymer process or the semi-prepolymer process, which are known per se, frequently using mechanical equipment such as that described in, for example, U.S. Pat. No. 2,764,565, the disclosure of which is herein incorporated by reference. Details as to processing equipment which is also considered suitable for the process of the invention are set forth in the Kunststoff-Handbuch [Plastics Handbook], Vol VII, published by Vieweg und Höchtlen, Carl-Hanser-Verlag, Munich 1966, for example on pages 121–205.

In accordance with the invention, an isocyanate index of 90 to 300, and frequently an isocyanate index of over 150 such as, for example of 200 to 300, is generally considered as a suitable working isocyanate index. By the term "Isocyanate Index" (also commonly referred to as NCO index), as used herein is defined as the equivalents of isocyanate, divided by the total equivalents of isocyanate-reactive hydrogen containing materials, multiplied by 100.

Foaming of the components which form the reaction mixture occurs in closed molds.

Suitable materials to be used as the thin, flexible facings in the present process include those conventional commercial sheets or molded skins less than 10 mm thick, preferably less than 2 mm thick. These sheets include, for example, PVC/ABS; ASA, etc. These sheets form the facing of the molded body and may be, for example, deep-drawn in the mold via the thermoforming process. Alternative processes for manufacturing flexible, soft facings, such as powder-slush-molding using PVC powders to produce molded skins, are likewise considered suitable. Similarly, other types of facing materials such as, for example, textile-laminated sheets, may be used.

The polyurethane foams of the composite sheet body are characterized by a molded foam density of less than 300 g/l, preferably of from 20 to 150 g/l, and most preferably of from 20 to 90 g/l; and a crush hardness of more than 100 kPa at 40% compression, and preferably from 200 to 900 kPa at 40% compression; as well as a coefficient of thermal expansion of less than $100 \times 10^{-6}$/K, and preferably less than $25 \times 10^{-6}$/K. The low coefficient of thermal expansion is made possible by the use of polyether polyols as isocyanate-reactive compounds with water as the blowing agent to form the polyol side, and polymeric diphenylmethane diisocyanates having a polymeric component of more than 10% by weight, and preferably from 25 to 65% by weight, on the isocyanate side.

The invention is further illustrated but is not intended to be limited by the following examples in which all parts and percentages are by weight and all temperatures are degrees Celsius unless otherwise specified. The invention, which is set forth in the foregoing disclosure, is not to be limited either in spirit or scope by these examples.

EXAMPLES

The following materials were used in the examples.

PMDI: a polymeric diphenylmethane diisocyanate (MDI) containing 50% by weight polymeric MDI, having an isocyanate content of 31% by weight, and a viscosity of 200 mPas A: a trifunctional polyether having an OH number of 28; prepared by propoxylation of trimethylolpropane followed by ethoxylation B: a trifunctional polyether having an OH number of 28; prepared by propoxylation of trimethylolpropane followed by ethoxylation, onto which a 20% by wt. styrene acrylonitrile content is applied by grafting C: a bifunctional polyether having an OH number of 28 prepared by propoxylation of propylene glycol followed by ethoxylation D: prepared by the propoxylation of triethanolamine; having an OH number of 500

E: prepared by the propoxylation of sorbitol; having an OH number of 100

F: prepared by the propoxylation of ethylenediamine; having an OH number of 630;

G: an aminocrotonic acid ester

H: the propoxylation product of propylene glycol; having an OH number of 180

K: N,N-dimethylcyclohexylamine

M: the propoxylation product of a starter mixture of sucrose, propylene glycol and water; having a functionality of about 5.3 and an OH number of 470

N: the propoxylation product of trimethylolpropane; having an OH number of 380

P: a 25 wt-% solution of potassium acetate in diethylene glycol

R: dimethylaminoethoxyethanol

B 4690: a commercially available stabilizer from Goldschmidt

The chemical formulations for polyols described below have been processed using conventional manual and mechanical mixing methods such as have long been known in polyurethane processing. The reactivity data and free-rising density were determined on foams prepared by manual foaming in 500 ml beaker. The free volume density, rise time and initiation time were also determined on manually mixed foam samples, as is conventional in the PUR foams sector. The coefficient of thermal expansion was determined on mechanically foamed molded bodies (20× 20×4 cm) by the method of DIN 53752, the fogging value by that of DIN 75201 and the crush hardness at 40% compression by that of DIN 53577.

A tool for preparing laboratory plaques was used. The tool was heated to a temperature of 40±3° C. Samples were molded by handmixing with a demold time of 5 min.

Formulation 1 from Table 1 describes a polyurethane filling foam utilized in accordance with the prior art to manufacture instrument panels. Adequate dimensional stability is achievable only by means of a reinforcing support to which the foam adheres. The molded bodies suitable for use in accordance with the invention can be manufactured from formulations 2 to 4 by foaming them onto the desired facing. The low coefficient of thermal expansion means that dimensionally stable components can be manufactured for utilization as self-supporting components in vehicles. Formulation 2 is a suitable formulation for producing a composite body suitable for application as vehicle bumpers, and formulations 3 and 4 are suitable formulations for producing composite bodies suitable for application as instrument panels and as energy-absorbing protective elements in the door region.

TABLE 1

| Foam formulations | | | | |
|---|---|---|---|---|
| Formulation (Examples) | 1 | 2 | 3 | 4 |
| A | 72 | | | |
| B | 18 | 80 | | |
| C | | | 67 | |
| M | | | 17 | |
| K | | | 2 | |
| H | | | | 70 |
| N | | | | 20 |
| Glycerol | | | | 7 |
| P | | | 4 | 2 |
| R | | | | 1.5 |
| B 4690 | | | 1 | 0.1 |
| D | | 2.75 | | |
| F | | 10 | 55 | |
| Triethanolamine | | 2 | | |
| Diethanolamine | 0.5 | 2 | 1 | |
| E | | 2 | 0.1 | |
| G | 2.0 | 2.7 | | |
| Water | 3.4 | 4.5 | 4 | 7 |
| PMDI | 60 | 100 | 300 | 280 |
| Isocyanate Index | 100 | 100 | 252 | 200 |

TABLE 2

| Reactivities and properties of foam formulations | | | | |
|---|---|---|---|---|
| Examples | 1 | 2 | 3 | 4 |
| Density | 70 | 70 | 70 | 50 |
| Initiation time (s) | 14 | 13 | 18 | 6 |

TABLE 2-continued

| Reactivities and properties of foam formulations | | | | |
|---|---|---|---|---|
| Examples | 1 | 2 | 3 | 4 |
| Rise time (s) | 115 | 85 | 57 | 32 |
| Fogging, method B (mg) | 0.5 | 0.7 | 0.9 | 0.5 |
| Free-rising density (g/l) | 55 | 54 | 38 | 33 |
| Coefficient of thermal expansion ($10^{-6}$/K.) | 155 | 65 | 13 | 11 |
| Crush hardness @ 40% | 53 | 200 | 700 | 400 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of composite bodies by back-foaming a flexible facing as a top layer with a reaction mixture comprising a polyisocyanate and an isocyanate-reactive component which react fully to form a polyurethane foam, the improvement wherein (i) the flexible facing has a thickness of less than 10 mm,
   (ii) the polyurethane foam has a density of less than 300 g/l,
   (iii) the polyurethane foam has a coefficient of thermal expansion of less than $100 \times 10^{-6}$/K,
   and
   (iv) said process is conducted in the absence of reinforcing agents.

2. The process of claim 1, wherein said flexible facing has a thickness of less than 2 mm, and said polyurethane foam has a density of from 20 to 150 g/l and additionally contains isocyanurate groups.

3. The process of claim 2, wherein said polyurethane has a density of from 20 to 90 g/l.

4. The process of claim 1, wherein characterized said polyurethane foam has a crush hardness greater than 100 kPa at 40% compression.

5. The process of claim 1, wherein said polyurethane foam is prepared from a reaction mixture comprising polyisocyanates of the diphenylmethane diisocyanate type.

6. The process of claim 1, wherein said flexible facing is selected from the group consisting of plastics sheets, plastics shells, textile sheets, leather skins and thin metals.

* * * * *